United States Patent [19]

Mita et al.

[11] Patent Number: 4,547,895
[45] Date of Patent: Oct. 15, 1985

[54] PATTERN INSPECTION SYSTEM

[75] Inventors: Kikuo Mita, Yokohama; Masayuki Oyama, Hino; Takashi Yoshida, Kawasaki; Masato Nakashima, Yokohama; Katsumi Fujihara, Sagamihara; Tadao Nakakuki, Tokyo, all of Japan

[73] Assignee: Fujitsu Limited, Kawasaki, Japan

[21] Appl. No.: 428,605

[22] Filed: Sep. 30, 1982

Related U.S. Application Data

[63] Continuation-in-part of Ser. No. 197,345, filed as PCT JP 79/00271, Oct. 25, 1979, published as WO 80/01002, May 15, 1980, § 102(e) date June 23, 1980, Pat. No. 4,392,120.

[30] Foreign Application Priority Data

Oct. 30, 1978 [JP] Japan ................ 53-133610
Nov. 13, 1978 [JP] Japan ................ 53-155946
Nov. 28, 1978 [JP] Japan ................ 53-146865
Nov. 28, 1978 [JP] Japan ................ 53-146870

[51] Int. Cl.⁴ .............................. G06K 9/00
[52] U.S. Cl. .............................. 382/8; 250/563; 250/572; 356/237; 356/384; 356/387; 382/22; 382/41; 382/68

[58] Field of Search ............... 382/4, 8, 22, 68, 41; 356/237, 239, 376–377, 379–380, 383–384, 387; 358/106, 107, 101; 364/490–491, 507

[56] References Cited

U.S. PATENT DOCUMENTS 3,624,606 11/1971 Lefevre ........................ 382/4
4,392,120 7/1983 Mita et al. .................... 382/22

Primary Examiner—Leo H. Boudreau
Attorney, Agent, or Firm—Staas & Halsey

[57] ABSTRACT

A pattern inspection system for inspecting a pattern formed on a base, such as a photomask, by means of laser beam scanning which includes a device for detecting the body and edges of the pattern, a memory device having a plurality of memory units for separately storing the detected body and plurality of edges of the pattern, a device for measuring the width of the body of the pattern between two parallel edges of the pattern, a device for detecting and correcting missing pattern edges, a device for inverting the pattern, a device for reducing the pattern, and a device for eliminating pinholes and stains within the pattern.

17 Claims, 20 Drawing Figures

DIRECTION OF PATTERN EDGE(α)

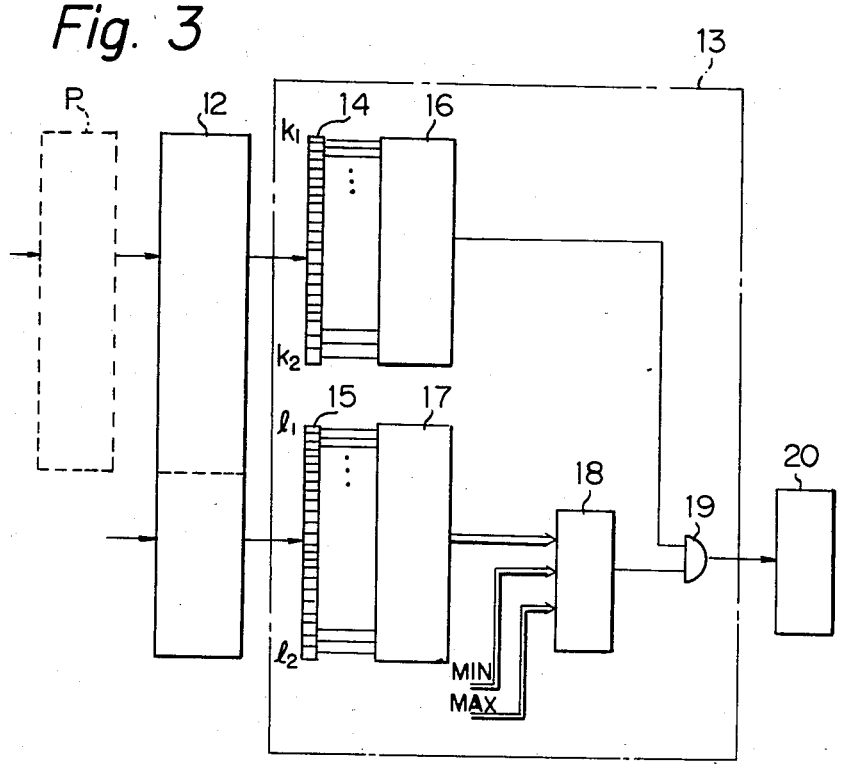
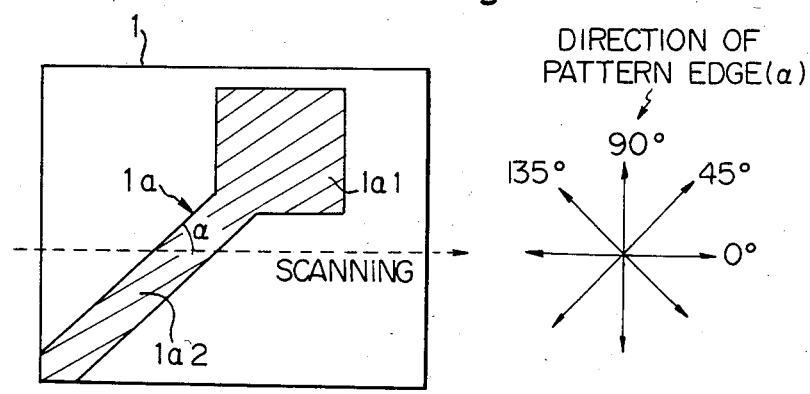

Fig. 5
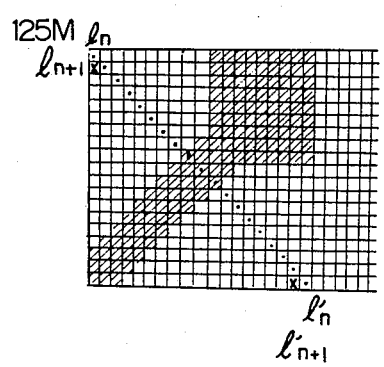
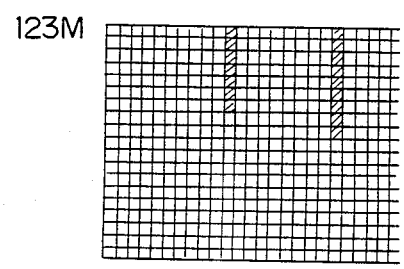
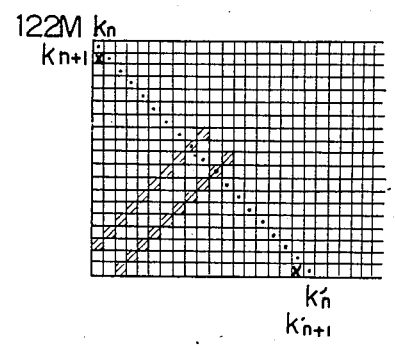
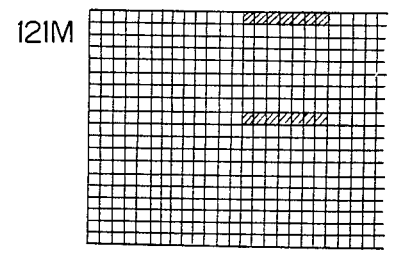

PATTERN INSPECTION SYSTEM

This is a continuation-in-part of application Ser. No. 197,345, filed on June 23, 1980, based on international application No. PCT/JP79/00271 filed on Oct. 25, 1979 and now U.S. Pat. No. 4,392,120.

BACKGROUND OF THE INVENTION

The present invention relates to a pattern inspection system for inspecting a pattern formed on a base. The present invention is used for inspecting patterns of photomasks which are used in the production of printed circuits.

In the prior art there is a method for inspecting patterns of photomasks, wich compares a pattern to be inspected with a reference pattern by means of a microscope. This method has two limitations: (1) it is not possible for a person to measure the width of the pattern, and (2) the method requires that the two patterns be aligned. This prior art method is disclosed in, for example, the thesis "Automated Equipment for 100% Inspection of Photomasks", by K. Levy, Solid State Technology, pp. 60 to 71, May 1978.

There is another prior art method for inspecting patterns of photomasks in which pattern data consisting of electrical signals transduced from light scanning a pattern to be inspected are compared with reference pattern data converted from the design data of a photomask. This method has three limitations in that it requires a process to align the reference and scan data, the original design data for the reference pattern must be generated and a high speed computer for converting the original design data is necessary. This prior art method is disclosed in, for example, the thesis "Automatic Mask Inspection for Registration Errors and Critical Dimensions", by O'Callaghan et al., Symposium of the Society of Photographic Scientists and Engineers, February 1975.

The present invention has been proposed in order to solve the problems involved in the prior art pattern inspection methods, as set forth above, and to provide a more precise and practical pattern inspection system without using reference pattern data.

A preceding invention regarding a pattern inspection system invented by some of the inventors of the present invention was disclosed in the Japanese Patent Application Laid-open No. 53-24233. This pattern inspection system includes light scanning means for scanning a photomask pattern being tested by a light beam, means for providing information indicating the width of the pattern in the direction of scanning by detecting the light transmitted through or reflected by the photomask having the pattern, and means for providing information indicating the angle of the pattern with respect to the direction of scanning by detecting the light diffracted at the edge of the pattern. In this system, the width of the pattern is measured by combining the information indicating the width of the pattern and the information indicating the angle of the pattern. The present invention utilizes the technique of this preceding invention.

SUMMARY OF THE INVENTION

The present invention includes means for separately examining photomask patterns for defects in a plurality of directions and means for separately storing the information obtained from examination of the patterns in the regions of a memory device corresponding to a plurality of directions, respectively.

A principal object of the present invention is to provide a correct, rapid, and practical system for inspecting patterns, eliminating the process of aligning two patterns, eliminating the need for reference data, and eliminating the need for a high-speed computer.

Another object of the present invention is to provide a pattern inspection system to deal with various types of defects in a pattern.

BRIEF DESCRIPTION OF THE DRAWINGS

FIG. 3 illustrates the details of the pattern width-measuring device in the system of FIG. 1;

FIG. 4 illustrates an example of a photomask having a pattern for which the inspection is effected in accordance with the present invention;

FIG. 5 illustrates the status of the memory of the memory device in the system of FIG. 1;

DETAILED DESCRIPTION OF THE PREFERRED EMBODIMENT

Figure 1:
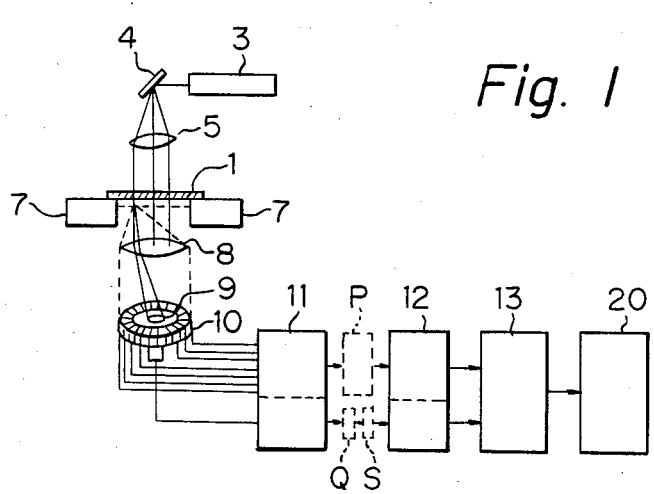
FIG. 1 is a schematic diagram of a pattern inspection system in accordance with an embodiment of the present invention.
Figure 2:
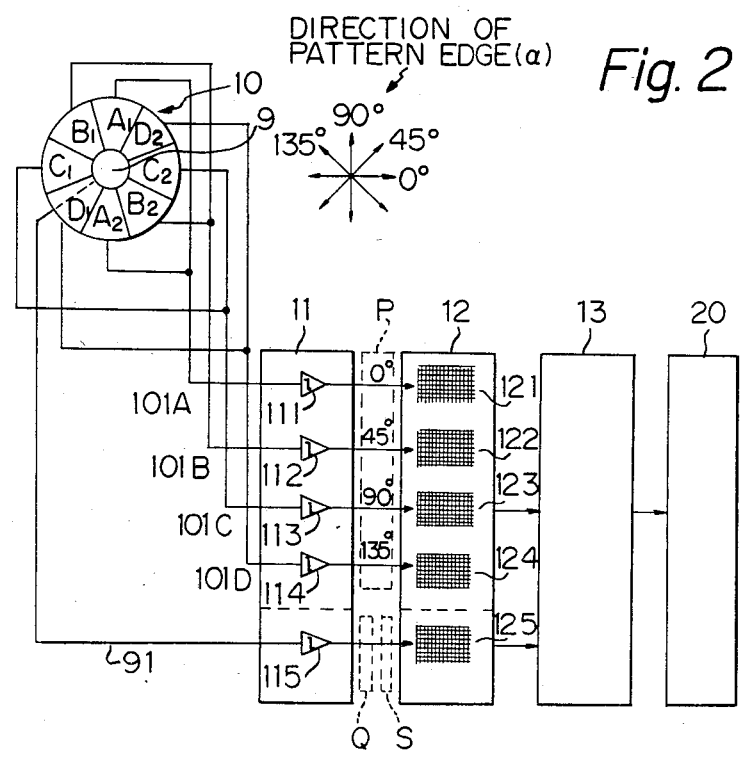
FIG. 2 illustrates the details of the light signal-detecting device in the system of FIG. 1.

A pattern inspection system for inspecting a pattern of a photomask is illustrated in FIGS. 1, 2, and 3.

A process to detect the angle of the edges of a pattern will now be described. A laser beam emitted by a laser beam source 3 is periodically deflected in a first direction by light-deflecting means, such as a galvanically actuated mirror 4, passes through a scanning lens 5, and then is projected through a photomask 1 having a pattern fixed to a stage 7 moving in a second direction perpendicular to the first direction. An example of a plan view of a portion of the photomask 1 is illustrated in FIG. 4. The photomask 1 has a pattern 1a consisting of a land portion 1a1 and a lead portion 1a2. The laser beam transmitted through the photomask 1 passes through a focusing lens 8, then is projected onto an angle detection device 10 which detects the angle α between the edge of the pattern 1a and the scan line.

When a laser beam passes through the edge of the pattern, the laser beam is diffracted in a direction perpendicular to the edge line of the pattern. Accordingly, it is possible to detect the angle of the edge line of the pattern with respect to the scan line by detecting the orientation of the diffraction pattern so produced by means of the angle detection device 10.

The details of the angle detection device 10 are illustrated in FIG. 2. The angle detecting device includes light-detecting elements $A_1$, $B_1$, $C_1$, $D_1$, $A_2$, $B_2$, $C_2$, $D_2$. Each pair of the elements $A_1$, $A_2$; $B_1$, $B_2$; $C_1$, $C_2$; and $D_1$, $D_2$ is arranged across from each other and a center line passing through the elements pair forms a 45° angle, with respect to the center line of the next adjacent pair. When a light passing through a portion of the edge of the pattern 1a of the photomask 1 is received by the angle detecting device 10 and the angle of the edge with respect to the scan line at this portion is 0°, an output signal 101A indicating a 0° angle of the edge line of the pattern is obtained from the pair of elements $A_1$, $A_2$. In the same way, output signals 101B, 101C, and 101D indicating 45°, 90°, and 135°, respectively, of the angles of the edges of the pattern with respect to the scan line are obtained from the pairs of elements $B_1$, $B_2$; $C_1$, $C_2$; and $D_1$, $D_2$, respectively.

A process to detect the light transmitted through a pattern will now be described. A light-detecting element 9 located at the center of the angle-detecting device 10 receives the laser beam transmitted through the focusing lens 8. The light-detecting element 9 produces an output signal 91, representing the intensity of the light passing through a portion of the photomask 1, so that the output signal represents the light which has been transmitted through the portion of the photomask 1.

A process to store the signals 101A, 101B, 101C, and 101D, indicating the directions of the edge of the pattern and the signal 91 indicating the light transmission through the pattern, will now be described. The output signal 101A of the light-detecting elements $A_1$, $A_2$ is applied to a comparator 111 to produce either a binary signal "1" or "0" in accordance with the value of the output signal 101A. This binary output signal of the comparator 111 is stored in a memory circuit 121 of the memory device 12. In the same way, the binary output signal of a comparator 112 receiving the signal 101B is stored in a memory circuit 122 of the memory device 12, the binary output signal of a comparator 113 receiving the signal 101C is stored in a memory circuit 123 of the memory device 12, and the binary output signal of a comparator 114 receiving the signal 101D is stored in a memory circuit 124 of the memory device 12. The output signal 91 of the light-detecting element 9 is applied to a comparator 115 to produce either a binary signal "1" or "0" in accordance with the value of the output signal 91. This binary output signal of the comparator 115 representing the body of the pattern and corresponding to light transmission (transparent) or light interruption (opaque) is stored in a memory circuit 125 of the memory device 12. Each of the memory circuits 121, 122, 123, 124, and 125 consists of a shift register.

Now, a process to measure the width of a portion of a pattern and a process to detect defects in the pattern will be described. The details of a circuit 13 for measuring the width of a portion of a pattern and detecting defects in the pattern are illustrated in FIG. 3. An example of the pattern 1a consisting of the land portion 1a1 and the lead portion 1a2 running at a 45° angle with respect to the scanning direction on the photomask 1 is illustrated in FIG. 4. An example of a set of memory states 121M, 122M, 123M, and 125M for the pattern 1a illustrated in FIG. 4 in the memory circuits 121, 122, 123, and 125, respectively, of the memory device 12 is illustrated in FIG. 5.

In FIG. 5, a state 121M of the memory circuit 121 for the signal 101A indicating the 0° orientation of the edge of the pattern, a state 122M of the memory circuit 122 for the signal 101B indicating the 45° orientation of the edge of the pattern, a state 123M of the memory circuit 123 for the signal 101C indicating the 90° orientation of the edge of the pattern, and a state 125M of the memory circuit 125 for the signal 91 indicating the body of the pattern or the transmission or lack of transmission of light through the pattern are illustrated. No memory state of the memory circuit 124M is illustrated in FIG. 5, because no edge of the direction of 135° exists in the pattern 1a as illustrated in FIG. 4.

The width of the lead portion 1a2 of the pattern illustrated in FIG. 4 is measured as follows. Information stored in the cells of the memory circuit 122 for the 45° orientation as illustrated in 122M is read out in the 135° orientation of the dotted line $k_n$ to $k'_n$ and the read-out information is registered in a shift register 14. The orientation of the reading-out is perpendicular to the angle of the edge of the pattern. Information stored in the cells of the memory circuit 125 representing the body of the pattern or the degree of transmission of light as illustrated in 125M is read out in the direction of the dotted line $l_n$ to $l'_n$, which is the same direction as $k_n$ to $k'_n$, and this readout is registered in a shift register 15.

The presence of registered information in the shift register 14 is detected by an OR circuit 16 which receives the signals in parallel from the elements of the shift register 14. The number of bits "1" registered in the shift register 15 is detected by a bit-summing circuit 17 which receives the signals in parallel from the elements of the shift registers 15. An output of the bit-summing circuit 17 which represents the width of the pattern is compared in a window comparator 18 with a predetermined maximum value (MAX) of the width of the pattern and with a predetermined minimum value (MIN) of the width of the pattern, so that the measured width of the pattern is checked to determine whether it falls within the range between said predetermined maximum and minimum values. An output of the OR circuit 16 and an output of the window comparator 18 are supplied to an AND gate 19. When the output of the OR circuit 16 is a signal indicating the presence of the pattern edge and the output of the widow comparator 18 is a signal indicating that the measured width of the pattern falls outside the range between said predetermined maximum and minimum values, an error signal indicating a presence of a defect in the pattern is produced from the AND gate 19. This produced error signal is written into the corresponding address of a memory 20 for storing information concerning defects in the pattern.

In the same way, a reading-out of the information in the direction $k_{n+1}$ to $k'_{n'1}$, which is adjacent to and parallel with the direction $k_n$ to $k'_n$ and a reading-out of the information in the direction $l_{n+1}$ to $l'_{n+1}$, which is adjacent of and parallel with the direction $l_n$ to $l'_n$ are effected, and accordingly the width of the pattern along the direction $l_{n+1}$ to $l'_{n+1}$ is measured. In the same way, a measurement of the width of the pattern along the 90° orientation is effected by means of the memory circuits 121M and 125M, and a measurement of the width of the pattern along the 0° orientation is effected by means of the memory circuits 123M and 125M.

Modifications of the embodiment described hereinbefore will now be described with reference to FIGS. 6 through 10.

Figure 6:
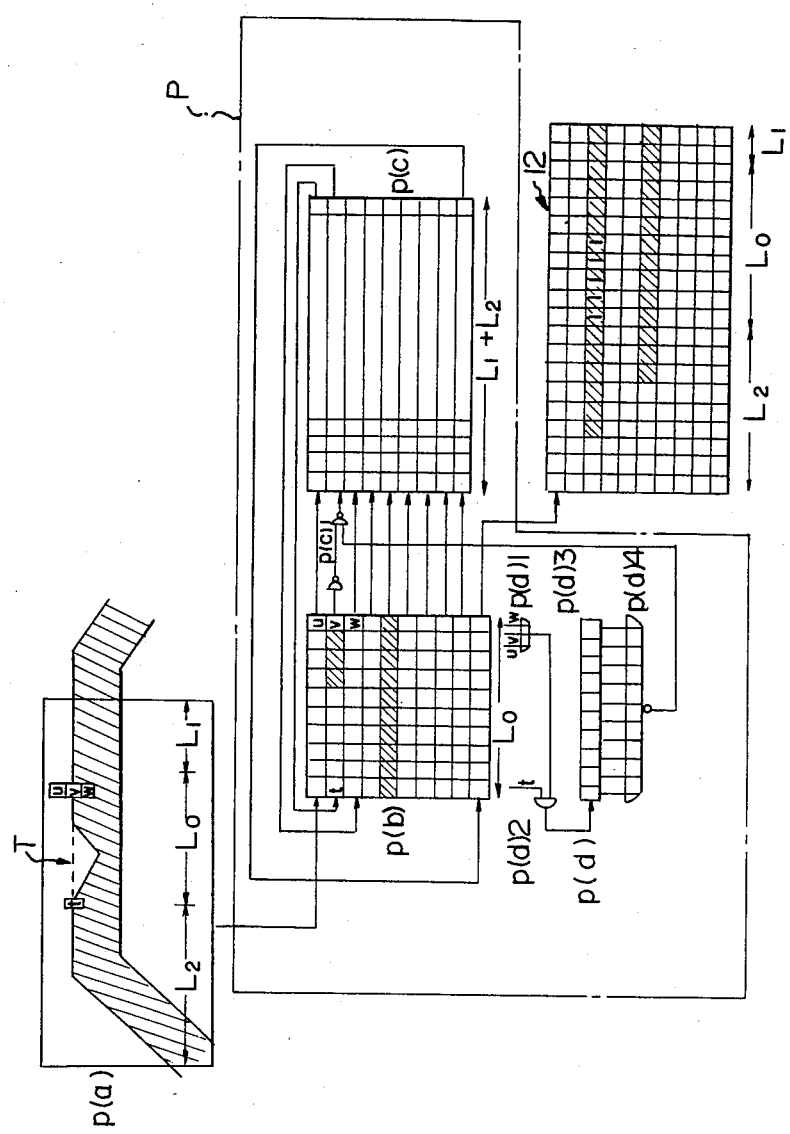
FIG. 6 is a schematic diagram of an interpolation circuit applicable to the pattern inspection system of FIG. 1.

A circuit P for interpolating a missing pattern edge signal is illustrated in FIG. 6. The circuit P is connected between the comparator 11 and the memory device 12 as illustrated in FIGS. 1 and 2. If a portion T of a pattern p(a) is defective and a portion of a straight edge line in the 0° orientation is missing in the portion T, it is impossible to measure the width of the pattern in the portion T because of pairs of pattern edge signals in the 0° orientation are obtained in the portion T. In order to solve this problem, a circuit P for interpolating a missing pattern edge signal is provided, as illustrated in FIG. 6.

The circuit P includes a first shift register p(b) having N lines, each line of which includes to bits, a second shift register p(c) having (N−1) lines, each line of which includes ($L_1 + L_2$) bits, and a bit-interpolating circuit p(d).

In the circuit P, a sequence of pattern edge signals produced by scanning the pattern p(a) is registered in the first line of a shift register p(b) and shifted along the line, then a sequence of output signals of the shift register p(b) is registered in the first line of a shift register p(c). A sequence of output signals of the nth line of the shift register p(c) is supplied to the (n+1)th line of the shift register p(b). A sequence of output signals of the Nth line of the shift register p(b) is supplied to and stored in a memory device 12 for storing pattern edge signals.

If a signal is present in any one of the cells u, v, and w, which are located at a predetermined distance from a cell t the OR gate p(d)1 produces an output signal if a signal is also present in cell t, then the AND gate p(d)2 produces an output, and, accordingly, a signal "1" is supplied to the shift register p(d)3 of the interpolating circuit p. Data ($X_1, X_2, \ldots X_n$) registered in the shift regiseter p(d)3 are supplied in parallel to a NOR gate p(d)4. The NOR gate p(d)4 produces a signal "0" when at least one "1" signal is present in the shift register p(d)3. Thus, the NAND gate p(c)1 produces a signal "1" in the case where the signal of the cell v is "1", while the NAND gate p(c)1 produces a signal "0" when the signal of the cell v is "0" and the signal output by p(d)4 is "1". Accordingly, the data of the cell v is converted. The relationship between the data of the cells u, v, and w and the converted data of the cell v is indicated in the table below. t,0100

Accordingly, an interpolation of the missing portion of the edge line of the defective T in the pattern p(a) is achieved. A sequence of output signals of the shift register p(b), including the thus interpolated signals, is supplied to and stored in the memory device 12. A measurement of the width of a pattern having defects is effected in the circuit 13 with the aid of the information stored in the memory device 12.

Figure 7:
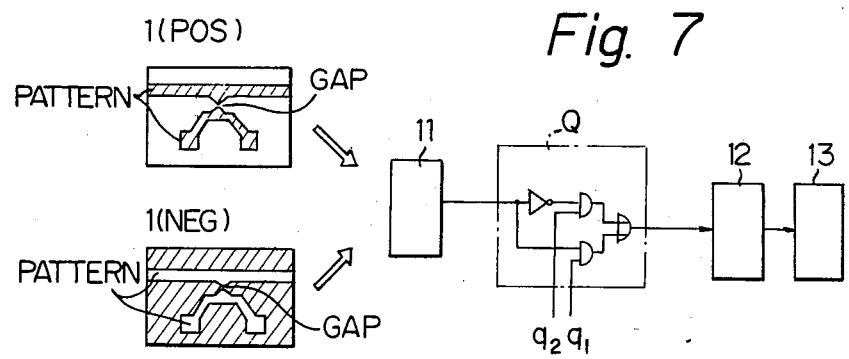
FIG. 7 is a schematic diagram of a pattern data-switching circuit applicable to the pattern inspection system of FIG. 1.

A pattern data-switching circuit Q for selecting the correspondence of signal "1" to either light transmission or light interruption is illustrated in FIG. 7. In the case where a measurement of the width of the pattern of a positive film 1 (POS) or the gap between the pattern of a negative film 1 (NEG) is desired, signal "1" is supplied to the input $q_1$ of the circuit Q and signal "0" is supplied to the input $q_2$ of the circuit Q. In this case, binary signals representing light transmission and light interruption are stored in the memory device 12 without inversion. In the case where a measurement of the gap between the patterns of a positive film 1 (POS) or the width of the pattern of a negative film 1 (NEG) is desired, a signal "0" is supplied to the input $q_1$ of the circuit Q and a signal "1" is supplied to the input $q_2$ of the circuit Q. In this case, the original binary signals representing light transmission and light interruption are inverted by the circuit Q and the thus-inverted binary signals are stored in the memory device 12.

Figure 8:
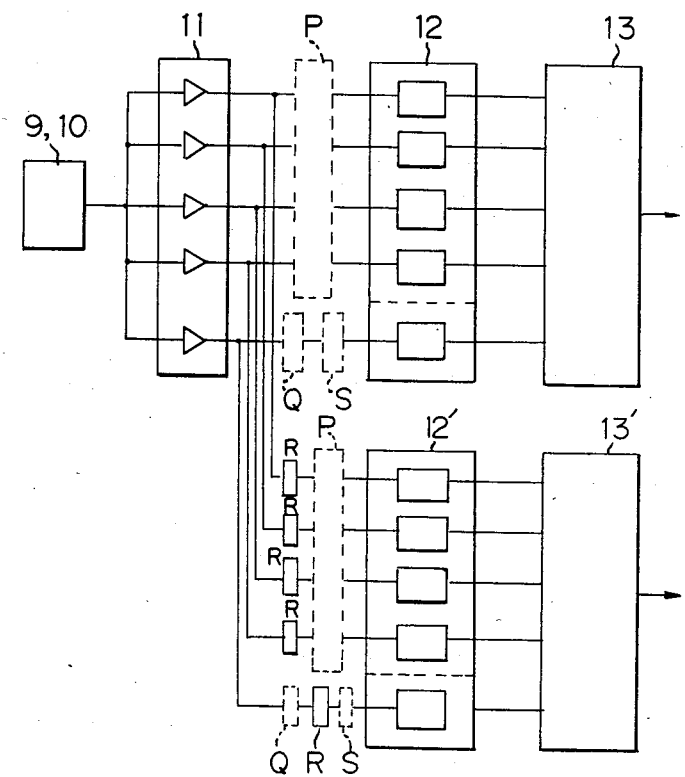
FIG. 8 is a schematic diagram of a pattern information-reducing circuit applicable to the pattern inspection system of FIG. 1.
Figure 9:
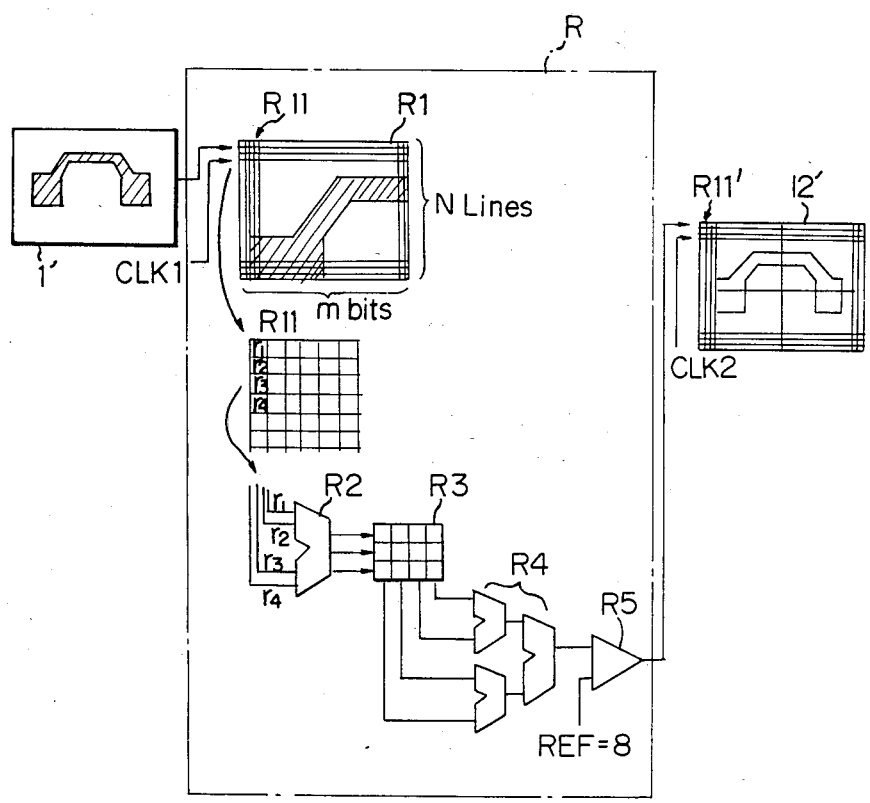
FIG. 9 illustrates the details of the circuit of FIG. 8.

A device R for reducing the pattern information stored in a memory circuit is illustrated in FIG. 9. The device R is connected between the comparator 11 and a memory device 12' as illustrated in FIG. 8. The memory device R for storing a reduced pattern includes a pattern data memory circuit R1 having N lines, each line of which includes m bits, a summing circuit R2, a shift register R3 having 3×4 bits, another summing circuit R4 and a comparator R5. In the shift register R1, the output of the nth line is supplied to the input of the (n+1)th line. The operation of the memory device R for storing a reduced pattern will be described with respect to, for example, a portion R11 having 4×4 bits of the pattern data memory circuits R1. Signals $r_1, r_2, r_3$ and $r_4$, each of whi h is stored in the first bit of the lines of the portion R11, are sent to the summing circuit R2, which produces a 3 bit output signal representing a sum of the signals $r_1, r_2, r_3$ and $r_4$. This output signal of the summing circuit R2 is supplied to the first line of the shift register R3 and registered in the shift register R3. A sequence of output signals of the shift register R3 is supplied to the summing circuit R4, which produces an output signal representing a sum of the sequence of output signals of the shift register R3. The output signal of the summing circuit R4 represents the number of the signals "1" in the portion R11 of 16 bits. The summing circuit R4 output signal and a reference signal representing a number 8 are supplied to the comparator R5. The comparator R5 produces an output signal "1" whenever the output signal of the summing circuit R4 is greater than or equal to 8. In this case the average signal for the portion R11 is the signal "1". The comparator R5 produces an output signal "0" whenever the output signal of the summing circuit R4 is less than or equal to 7. In this case, the average signal for the portion R11 is regarded as the signal "0". The comparator circuit R5 output signal, either "1" or "0", is supplied to and stored in the cell R11', located in the first line in the first column of a memory device 12' for the reduced pattern data. Thus, the average signal of the portion R11 of the memory circuit R1 is represented by the signal of the cell R11' of the memory device 12'. Accordingly, a reduction of pattern information stored in R1 by a ratio of 16:1 is achieved.

Figure 10:
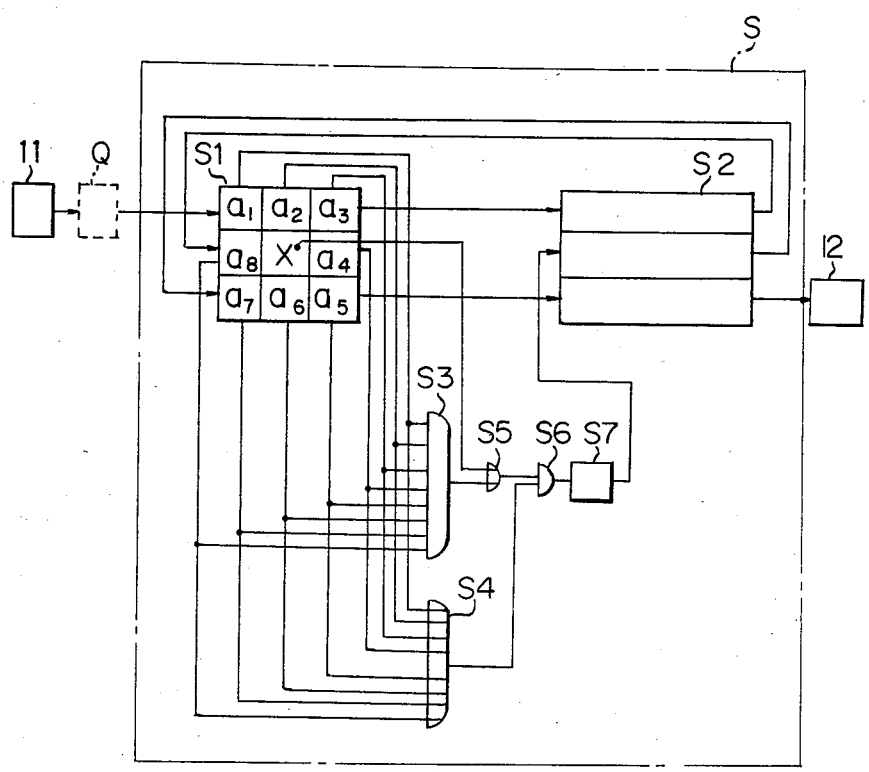
FIG. 10 is a schematic diagram of a stain-and-pinhole elimination circuit applicable to the pattern inspection system of FIG. 1.

A stain and pinhole elimination circuit S is illustrated in FIG. 10. The stain and pinhole elimination circuit S includes a shift register S1 having 3×3 bits, a shift register S2 having 3 lines, an AND gate S3, an OR gate S4, an OR gate S5, an AND gate S6 and a flip-flop circuit S7. A sequence of signals from the comparator 11 is supplied in the direction of the line. In order to determine whether a signal X registered in the central bit of the shift register S1 is a signal representing a light interrupting stain located in a light transmitting portion of a photomask or a light transmitting pinhole in a light interrupting portion of a photomask, eight signals $a_1, a_2, a_3, a_4, a_5, a_6, a_7$ and $a_8$, registered in eight bits surrounding the bit for the signal X, are checked.

Whenever each of the signals $a_1$ through $a_8$ is a signal "1", the output of the AND gate S3 and the output of the OR gate S4 produce an output signal "1", this results in the AND gate S6 producing an output signal "1", and as a result, the flip-flop circuit S7 is set to a "1" state. Output signals "1" of the flip-flop S7 are supplied, after a delay of one bit, to the first bit of the second line of the shift register S2. Thus when the signal X is a signal "0", this signal is inverted into a signal "1" and sent to the second line of the shift register S2. Thus, elimination of a pinhole is achieved.

Whenever each of the signals $a_1$ through $a_8$ is a signal "0", the AND gate S3 and the OR gate S4 produce an ouput signal "0", this results in the AND gate S6 producing an output signal "0", and as a result, the flip-flop circuit S7 is set to a "0" state. Output signals "0" of the flip-flop circuit S7 are supplied, after a delay of one bit, to the first bit of the second line of the shift register S2. Thus, when the signal X is a signal "1", this signal "1" is inverted into a signal "0" and sent to the second line of the shift register S2. Thus, elimination of a stain is achieved.

In the case where the signals $a_1$ through $a_8$ include both signals "1" and signals "0", the AND gate S3 produces an output signal "0" and the OR gate S4 produces an output signal "1". Thus the AND gate S6 produces the same signal as the signal X, and accordingly, the flip-flop circuit S7 is caused to be set to the same state as the signal X. Therefore, after a one bit delay, the signal X itself is sent to the second line of the shift register S2 without inverstion. This means that the signal X is determined to be neither a pinhole nor a stain.

Figure 11:
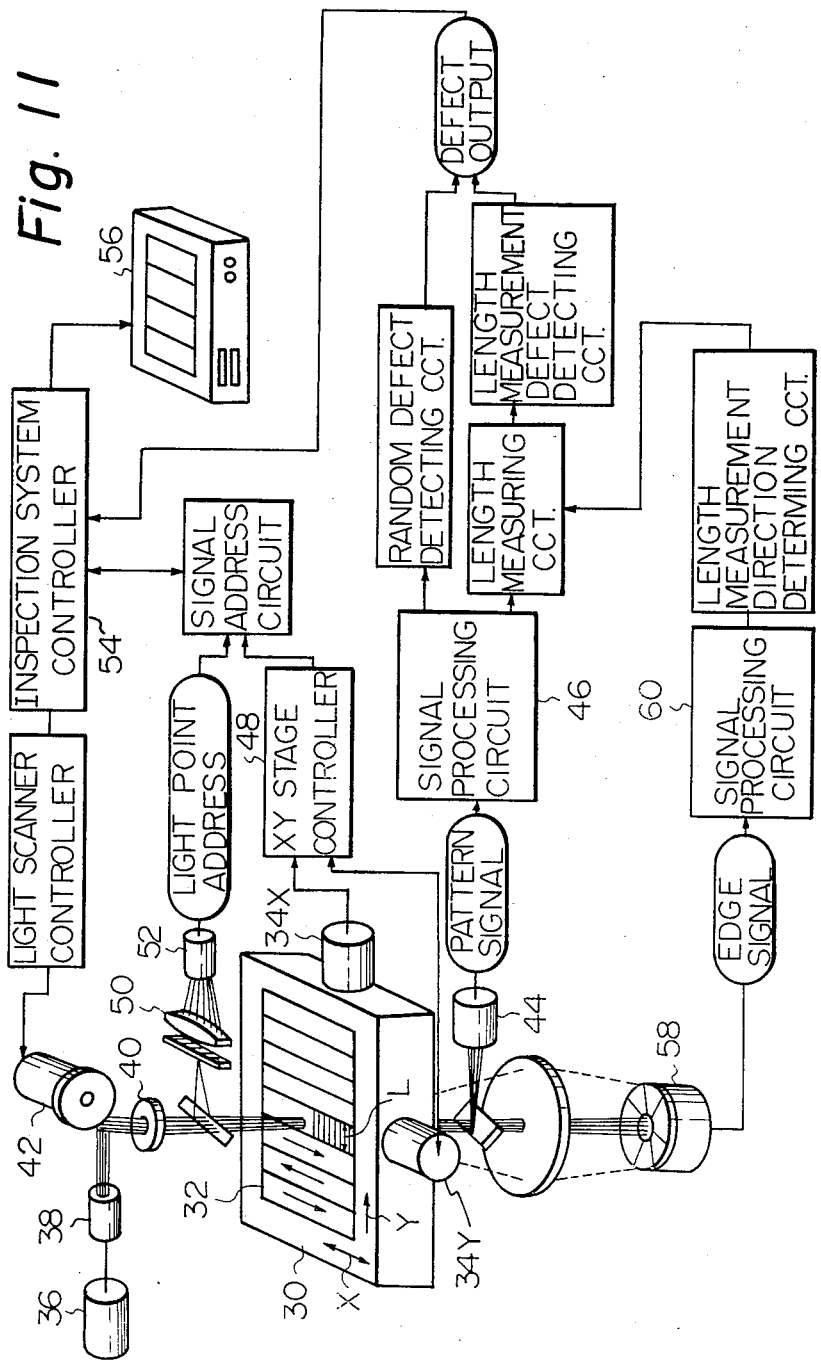
FIG. 11 illustrates a further modified embodiment of the present invention.

A further modified embodiment of the present invention will be explained with reference to FIGS. 11 through 20. In the pattern inspection system of FIG. 11, 30 is the XY stage which mounts the mask 32 and moves in the X, Y direction by means of the XY drive motors 34X, 34Y. The laser source is 36. The laser beam is converged by the lenses 38, 40 and projected on the mask 32 as a beam spot and is scanned by the light scanner (rotating polyhedral mirror) 42. The scanning range of the laser beam is comparatively narrow, as indicated by L in the figure, and the entire part of the mask 32 is zigzag scanned, as indicated in the figure, by combining the scanning for the width L and the movement in both the X and Y directions of the stage 30. The laser beam passing the mask 32 is photo-electrically converted by the light sensor 44 via the half mirror into a pattern signal. This pattern signal indicates the white and black image data of the mask 32, and since it is the analog signal, it is converted into a binary signal by the signal-processing circuit 46 in the next stage. In the case of this embodiment, such conversion is carried out by a method in which the pattern signal is converted to any of the white level or black level in a unit of 10 um in the scanning direction. In addition, the signal-processing circuit 46 carries out well-known elimination of isolated bits and round processing through pattern recognition and thereafter executes detection of defect and measurement of the length of defect. On the other hand, the location of a defect can be detected by combining the X, Y locations of stage 30, that is X, Y locations of the mask obtained from the XY stage controller 48 when said defect is detected and the projected location (beam point address) on the mask of the laser beam obtained from the location clock plate 50 and the light sensor 52, and this signal address is input into the inspection system controller 54 together with a defect output. Thereby, the location of the defect is indicated on the inspection result display unit 56. Reference numeral 58 indicates a light sensor for angle detection which outputs an edge signal which is subjected to interpolation processing and unwanted edge signal elimination at the signal-processing circuit 60 in order to determine the direction of length measurement. Thereby, the angle parameter for measuring the length of a defect can be obtained.

Figure 12:
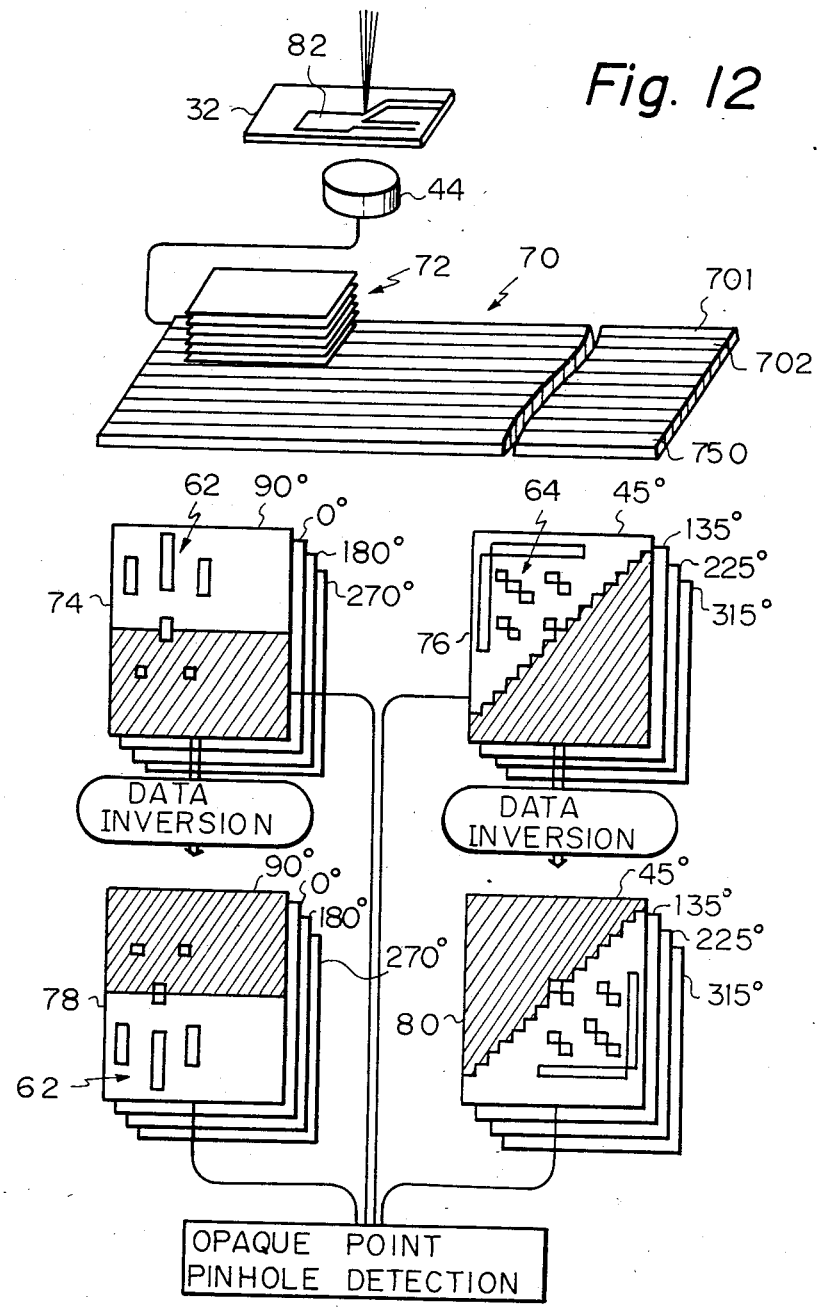
FIGS. 12 and 13 and FIGS. 17 through 19 show the inspection procedures.
Figure 13:
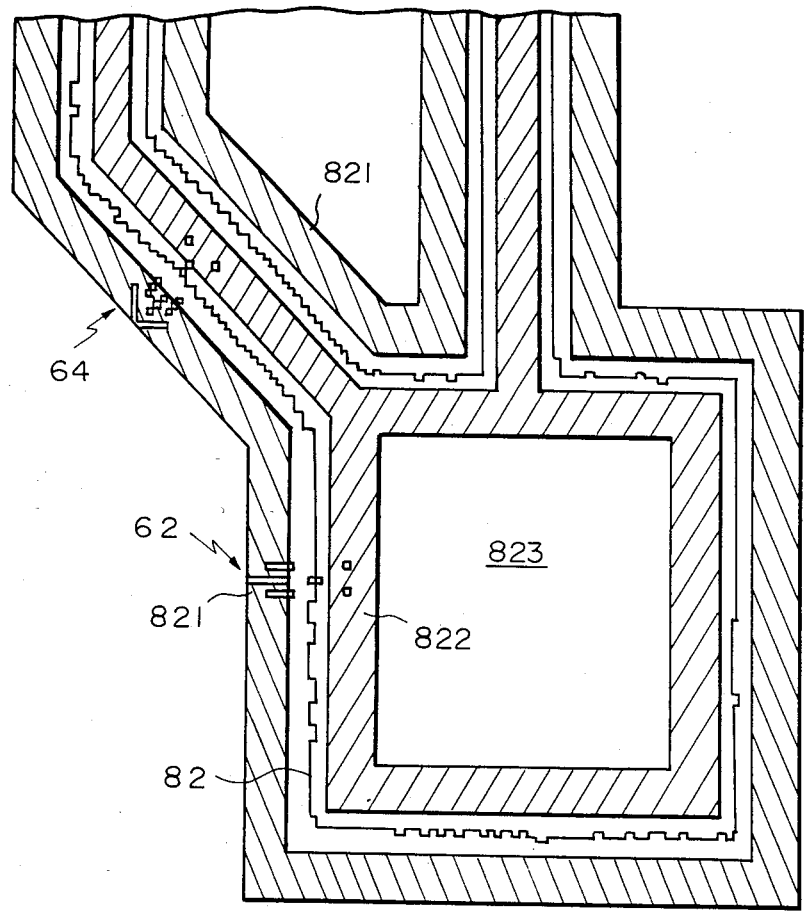

When the scanning output of pattern 82 of the mask 32 shown in FIG. 12 is expressed by binary codes, the pattern expressed in solid line 82 in FIG. 13 is obtained. The zigzag portion of the outline of pattern 82 of FIG. 13 is generated as the result of the conversion into the binary code expression. Defect inspection of the pattern 82 is not required for the entirety of the rectangular form including said pattern but only for the harmful defect-containing area indicated by the hatched portion. Namely, a typical defect within the pattern is pinholes. Pinholes do not result in any problem even when they exist in the center area 823 of a wide pattern or in a pattern which allows the insertion of IC pins because the former is soldered for wiring while the latter is provided with a hole allowing the insertion of IC pins. Pinholes existing in the inner edge 822 of the pattern, however, result in a defect which may cause disconnection of the wiring. A harmful defect at the circumference of the pattern is a projected part or mustache extending from other patterns which may result in short-circuiting. If there are no black points (general name for projected part, mustache, etc.) in the narrow belt region 821 surrounding the pattern 82, such pattern may be considered a defect-free pattern. Namely, if there is no pinhole in the portion 822 or black point in the portion 821, the mask can be considered a good one. In the case of the system of FIG. 11, a defect inspection for the portions 821 and 822 is carried out as follows. Namely, the image pattern is stored on the bidimensional register 70 as the binary-coded signal and the pattern to be inspected on said register is scanned using the inspection masks 62, 64.

Figure 14:
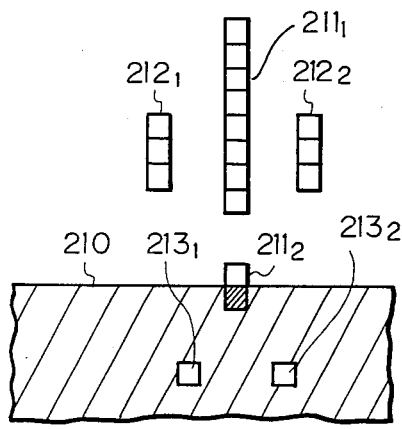
FIGS. 14, 15, and 16 show the inspection mask.
Figure 15:
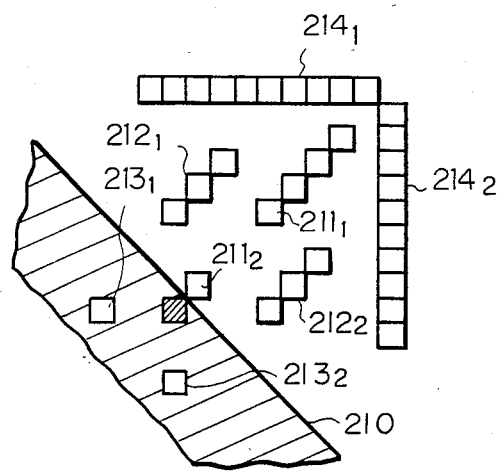
Figure 16:
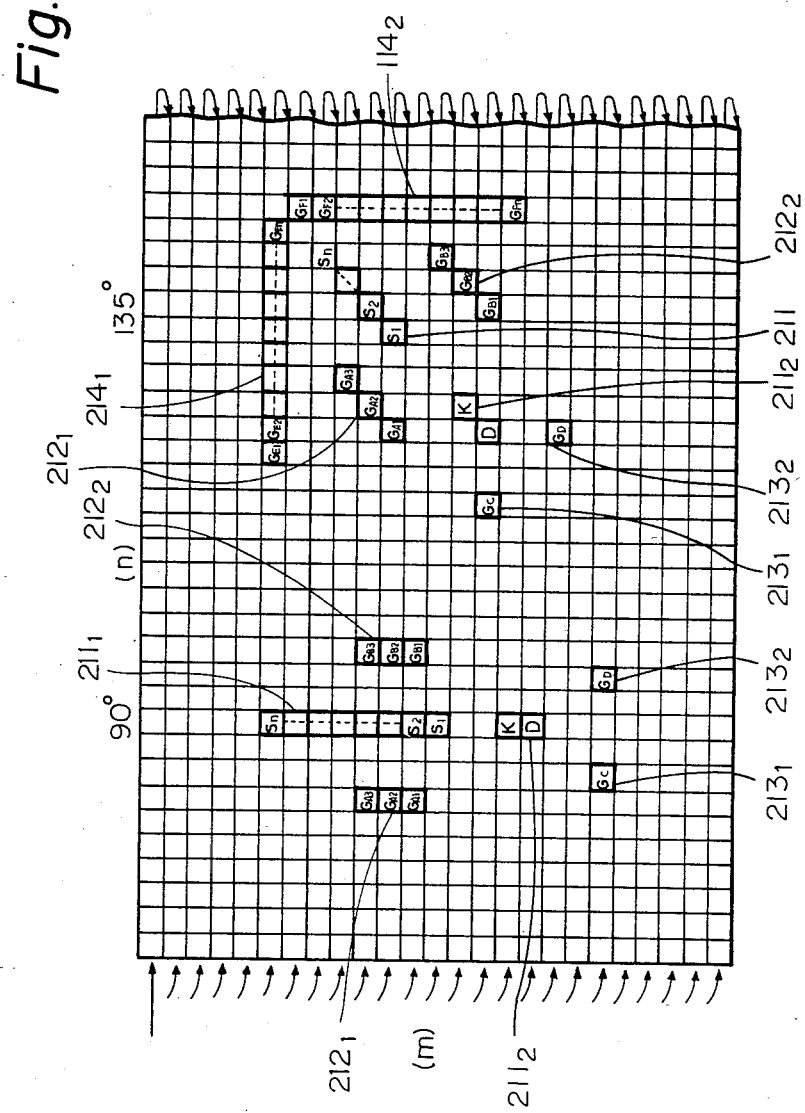

The details of inspection masks 62, 64 are shown in FIGS. 14, 15, and 16. FIGS. 14 and 15 show an example of an inspection mask previously formed in the bidimensional shift register 70 shown in FIG. 12. FIG. 14 shows the inspection mask arranged in the directions 0°, 90°, 180°, and 270° for the scanning direction while FIG. 15 shows the inspection mask arranged in the directions of 45°, 135°, 225°, and 315°. In other words, as shown in FIG. 14, the pattern of FIG. 14 is composed of a black point-detecting pattern consisting of a plurality of linear bits in the direction of 90° crossing orthogonally the pattern edge 210 formed in the direction of 0°, the first guard patterns $212_1$, $212_2$ consisting of three (3) bits on both sides at the center and the second guard patterns $213_1$, $213_2$ consisting of bit groups arranged on both sides in the forward direction. The pattern shown in FIG. 15 is composed of black point-detecting patterns $211_1$, $211_2$ formed in the direction of 45° orthogonally crossing the pattern edge 110 formed in the direction of 135°, the first guard patterns $212_1$, $212_2$, the second guard patterns $213_1$, $213_2$, and the third guard patterns $214_1$, $214_2$ consisting of a plurality of bits in the directions of 0° and 90°. Of these patterns, the black point-detecting pattern detects the pattern edge and indicates the length in the scanning direction of the black part of the pattern while the guard pattern inhibits misdetection at the pattern-bending portion in the vicinity of the pattern edge detected and also inhibits detection in the direction of an angle other than the specified one.

Therefore, the pattern to be inspected is checked under a normal condition in accordance with the following three detecting conditions for each detecting bit of the inspection pattern:
  (i) The black point-detecting patterns $211_1$, $211_2$ indicate the start of detection by sensing the pattern edge, and the length of the black point pattern-scanning direction is indicated by the detecting black points.
  (ii) The guard patterns $212_1$, $212_2$ and $214_1$, $214_2$ should include one or more white bits in each group.
  (iii) The guard patterns $213_1$ and $213_2$ should have the same sign. Namely, in case a bending portion exists or a direction is selected at an angle so that misdetection may occur in the vicinity of the area for detecting the edge of the pattern to be inspected, the guard pattern inhibits mis-inspection and does not allow any angle other than the specified one.

In FIG. 16, the inspection patterns shown in FIGS. 14 and 15 are set in the bidimensional shift register 70 of FIG. 12. To the bit elements of the respective patterns, the following signs are given:

Black point-detecting patterns $211_1$, $211_2$:
  D, K $S_1$ to $S_n$
Guard patterns $212_1$, $212_2$:
  $G_{A1}$ to $G_{A3}$, $G_{B1}$ to $G_{B3}$
Guard patterns $213_1$, $213_2$:
  $G_C$, $G_D$
Guard patterns $214_1$, $214_2$:
  $G_{E1}$ to $G_{En}$, $G_{F1}$ to $G_{Fn}$ Since the ordinary pattern edge direction is limited to eight directions of 0°, 45°, 90°, 135°, 180°, 225°, 270°, and 315°, these directions can be applied to all pattern edges by setting the pattern of FIG. 14 to 0°, 90°, 180°, and 270° and the pattern of FIG. 15 to 45°, 135°, 225°, and 315°.

Figure 20:
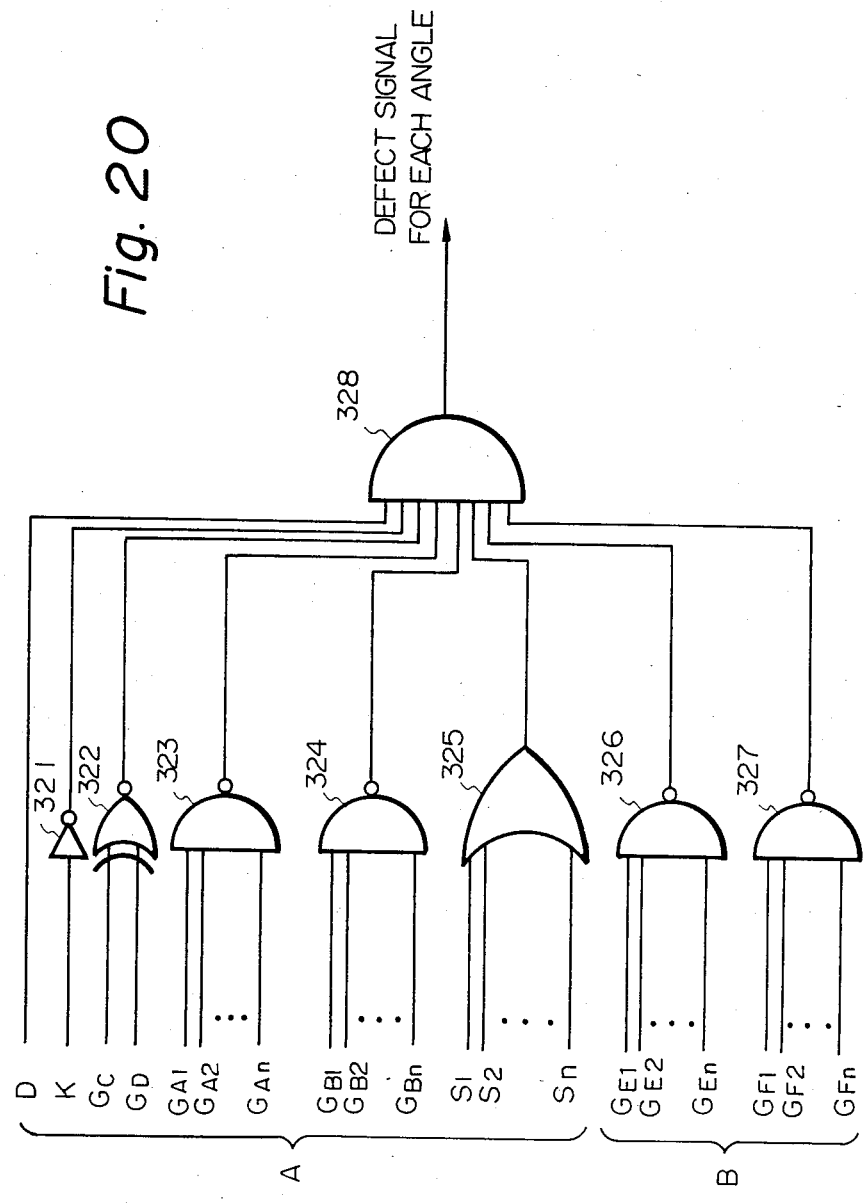
FIG. 20 shows the detection circuit.

FIG. 20 is an example of the detecting circuit which satisfies the detecting conditions explained in regard to FIGS. 14 and 15. Namely, D belonging to the black point-detecting pattern 211 of the inspection pattern is directly detected and K is detected via the NOT circuit 321. Then, since the guard patterns $212_1$, $212_2$ have the same sign under a normal conditions, $G_C$, $G_D$ are input into the EXNOR 322. Thereby, "1" or "0" is respectively obtained under a normal condition or an abnormal condition. The guard patterns ($G_{A1}$ to $G_{A3}$) $213_1$, ($G_{B1}$ to $G_{B3}$) $213_2$, ($G_{E1}$ to $G_{En}$) $214_1$, and ($G_{F1}$ to $G_{Fn}$) $214_2$ include one or more white bits under a normal condition. Therefore, these are detected by the NAND circuits 323, 324, 326, and 327, resulting in "1" under a normal condition or "0" uder an abnormal condition. Since $S_1$ to $S_n$ of the black point-detecting pattern $211_1$ is the black point detection signal, it becomes an output of the OR circuit 325.

The logical AND of group A among the above logic circuits satisfies the detecting conditions of the inspection pattern of FIG. 14 while the logical AND of group A+B satisfies the detecting condition of the inspection pattern of FIG. 15. As a result, the result "1" means normal while "0" means abnormal. The logical OR of the output of each inspection pattern in the OR circuit 6 of FIG. 20 teaches that there is a defect in any one or more directions among said eight directions.

Figure 17:
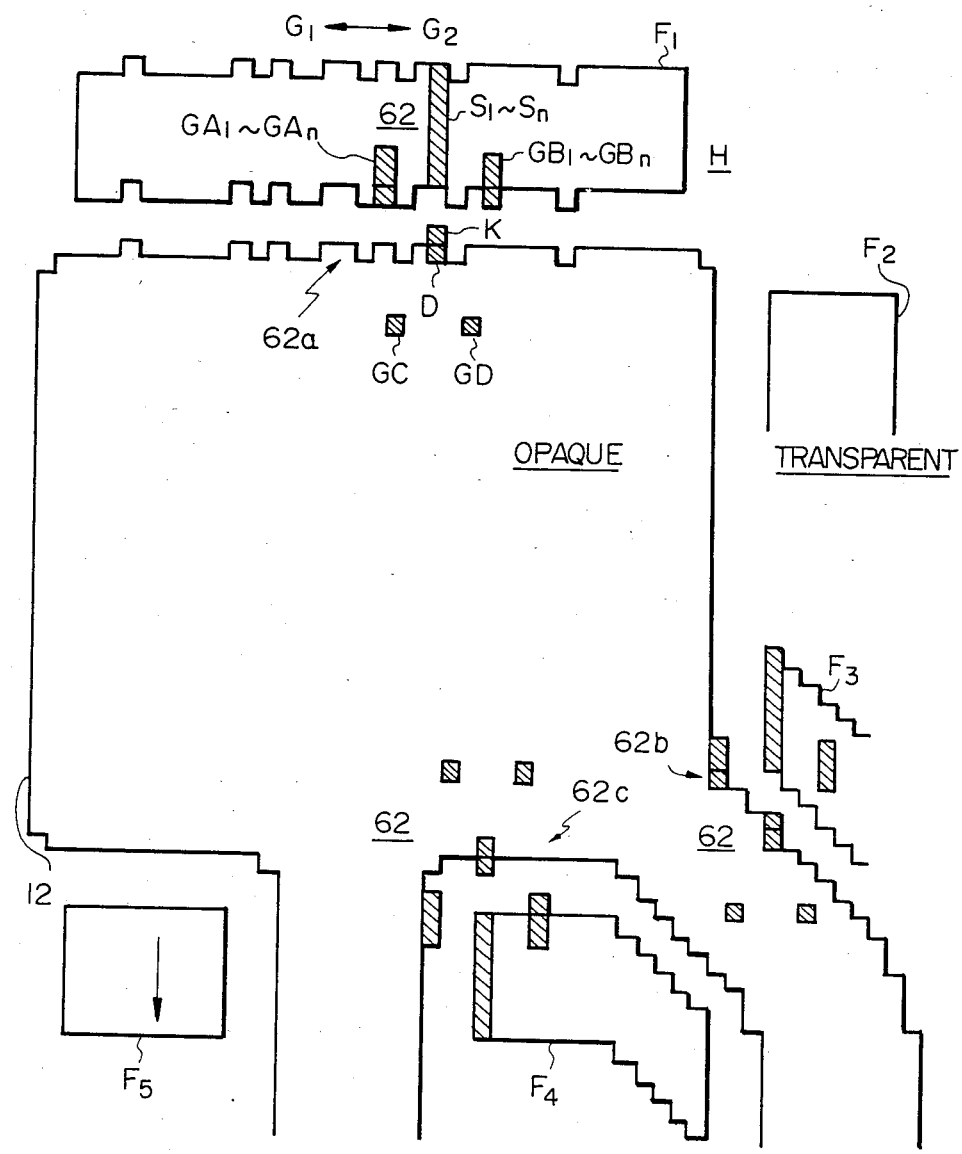
Figure 18:
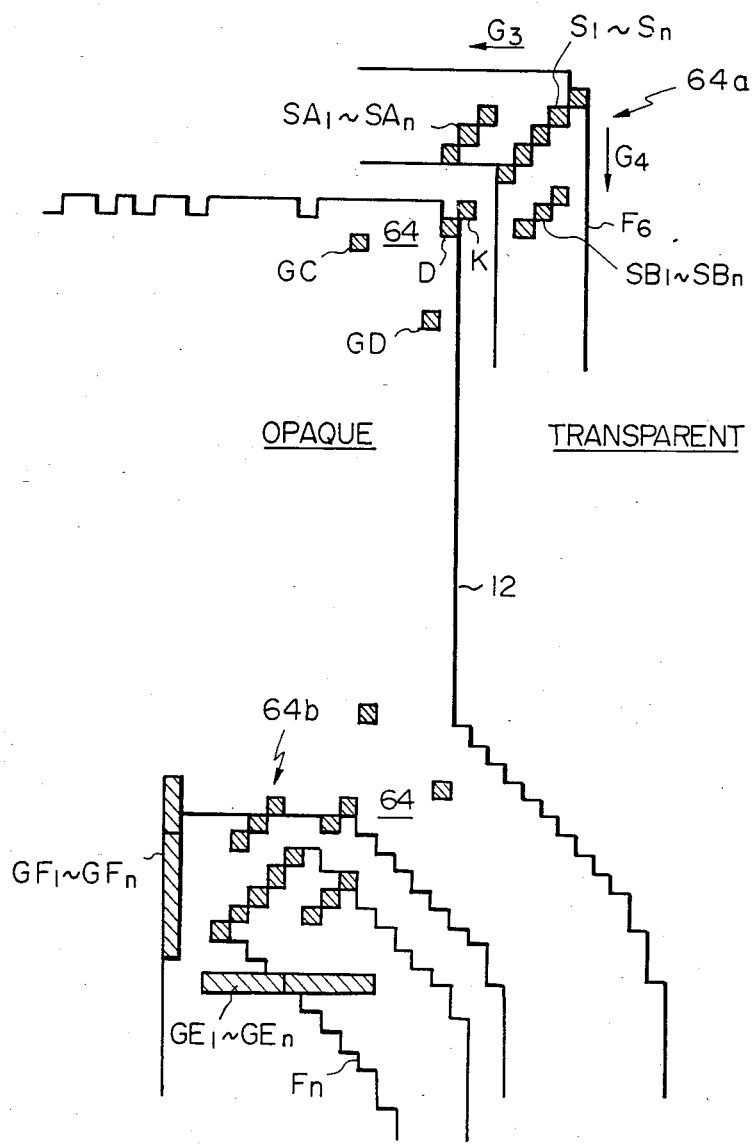

The defect inspection procedures using the inspection masks 62, 64 are explained with reference to FIGS. 17 through 19. First, when the mask 62 exists at the location 62a in FIG. 17, the bits D, K are divided into white and black, making possible inspection, and the bit groups ($G_{A1}$ to $G_{An}$) ($G_{B1}$ to $G_{Bn}$), $G_C$, $G_D$ also exist respectively in white or black, making possible inspection. As a result black point detection for the bit group ($S_1$ to $S_n$) is carried out. When the mask 62 is shifted in the directions indicated by the arrows $G_1$, $G_2$, black point detectable region also exist, and these regions can be summarized as the frame $F_1$. The left end of the frame $F_1$ corresponds to the point immediately before the point where the bit $G_C$ goes out of the pattern 82 and turns white while the right end of the frame $F_1$ corresponds to the point immediately before the point where the bit $G_D$ goes out of the pattern 82 and turns white. When the right edge of the pattern 82 is scanned by rotating the inspection mask for 90°, the region within the frame $F_2$ is inspected. In case the mask 62 is placed in the condition of 62b, the region within the frame $F_3$ is checked and the right end of this region corresponds to the point immediately before the point where the bit ($G_{A1}$ to $G_{An}$) enters the pattern 82. Moreover, in case the mask is placed in the condition of 62c, the frame $F_4$ is checked and the frame $F_5$ is also checked in the same way. The left and right ends of these frames $F_4$ and $F_5$, respectively, correspond to the points immediately before the points where the bit group ($G_{A1}$ to $G_{An}$) or ($G_{B1}$ to $G_{Bn}$) enters the pattern 82.

The inspection mask 62 can be rotated in a unit of 90° and inspection is possible under a condition of 0°, 90°, 180°, and 270°. But in any condition, the pattern corner indicated by the mark H in FIG. 17 cannot be inspected. The inspection mask 64 is provided for inspecting such corner, and the inspection condition is shown in FIG. 18. When the inspection mask is located at 64a, the bit $D_1$ is within the pattern but the bit $K_2$ is not within the pattern, making possible inspection, while any of bit groups ($G_{A1}$ to $G_{An}$), ($G_{B1}$ to $G_{Bn}$), and $G_C$, $G_D$ are located within or without the pattern, making possible inspection. Therefore, black point inspection for the inside of bit group ($S_1$ to $S_n$) is carried out. As will be obvious if the mask 64 is shifted so that the outline of the pattern 82 comes to the region between the bits $D_1$ and $K_2$, the region within the frame $F_6$ is inspected when the mask 64 at the location 64a is shifted in the directions $G_3$ and $G_4$, and thereby the detection of black point for the region, which is impossible for the mask 62, can be carried out. When the inspection mask 64 is placed in the condition of 64b, the region within the frame $F_7$ is inspected, and the borderline at the upper part of this region terminates at a point immediately before the bit groups ($G_{F1}$ to $G_{Fn}$) enter the pattern 82.

Inspections using the inspection masks 62, 64 are carried out in parallel, and, as a result the inspection regions using the masks may be partly or entirely overlapped. But overlapping is rather desirable for accurate inspection and results in no problem. A method of detecting black points at the circumference of the pattern is explained above, but when white and black are inverted, the pinholes (black points after inversion) within the pattern can be detected with these inspection masks. An example is shown in FIG. 19.

Figure 19:
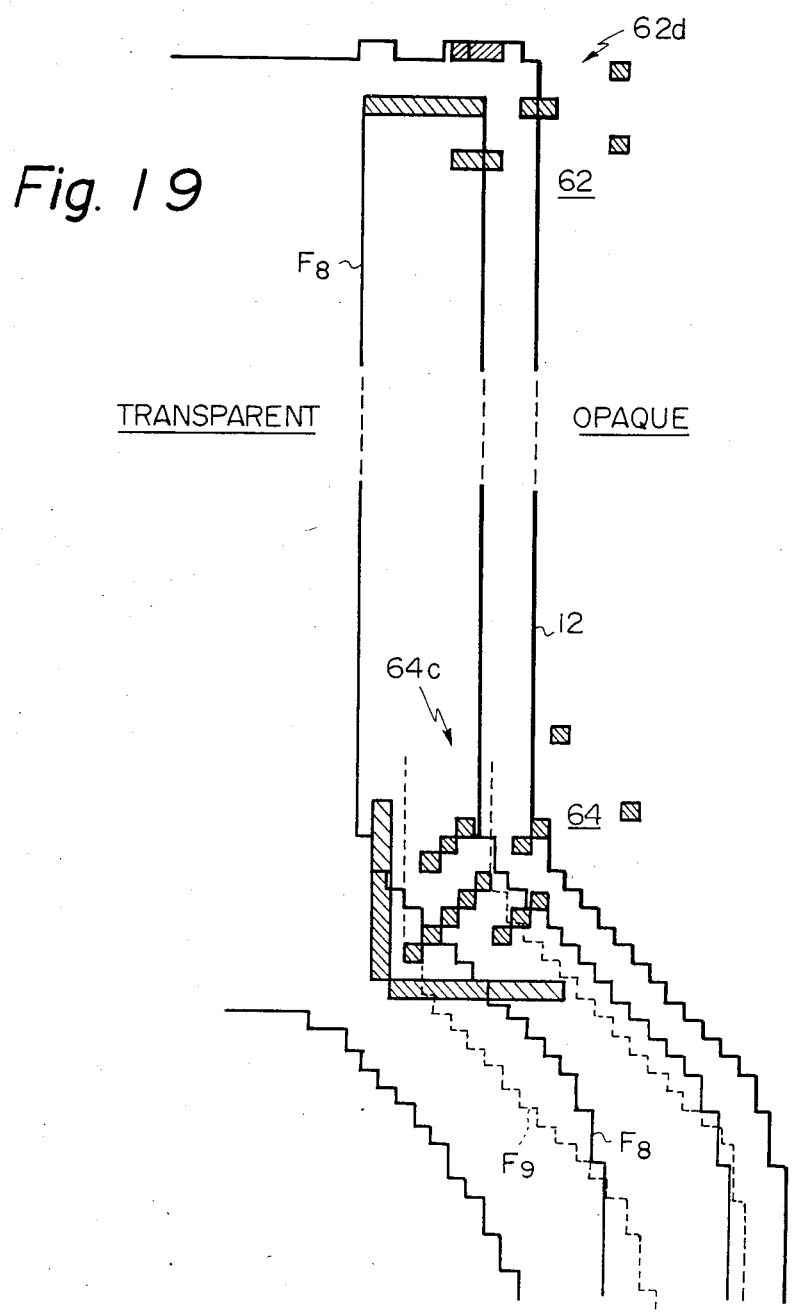

In FIG. 19, 82 is a pattern, the inside of the pattern being white and the outside being black since white and black are inverted. The size of the inspection masks 62, 64 can be changed as desired, and it is also possible to make the inspection mask for inspecting the inside of the pattern smaller than that for inspecting the outside of the pattern. On the contrary, the size of the inspection masks is determined equally in FIG. 19 and the size of the pattern formed is larger than that in FIGS. 17 and 18. Inspection carried out under a condition in which the mask 62 is placed in the condition of 62d makes possible the detection of pinholes within the frame F8, indicated by the solid line, while inspection carried out under a condition in which the mask 64 is placed in the condition of 64c makes possible the detection of pinholes within the frame F9, indicated by the dotted line.

For pinhole detection, the inspection mask is fixed and a conductor pattern is shifted within the memory. Namely, as shown in FIG. 12, the pattern 82 of the printed circuit board is scanned by the laser beam and the laser beam is photo-electrically converted by the photosensor 44. The signal obtained is then subjected to signal processing, such as binary coding, althogh not indicated, and is input into the bidimensional shift register 70 in order to sequentially shift the signal within said register. The register 70 is composed of about 50 register elements arranged in parallel, each element having a capacity to accept all the image signals in the scanning width of L. These elements are indicated as 701, 702, . . . , 750. The input terminal for the image signal to the register group, is the input terminal of element 701, the input terminal of element 702 is the output terminal of element 701, and so on. The input and output terminals are used in the same way. As an imaginary concept, the pattern 82 indicated in FIG. 13 gradually appears from the direction X and shifts in the shift direction and also grows in the direction Y by repeating such operation. Thereafter, it shifts one bit to the lower side and then appears again from the left end. When the inspection masks 62, 64 are placed in the desired position (this means the data of cells corresponding to the bit D, K, . . . , Sn of the register group is read), a result which is the same as that of defect detection can be obtained by shifting the inspection mask explained in regard to FIGS. 17 to 19. As explained above, the inspection mask 62 should have the locations 0°, 90°, 180°, and 270° while the mask 64 should have the locations 45°, 135°, 225°, and 315°. These locations are indicated by plural sheets of mask 72 in the drawing. The masks 74, 76, 78, and 80 visualize the contents of the register under the mask 72 while images 78, 80 are invented images of the masks 74, 76. Such images inversion can be realized by inversely reading each signal bit of the registers for each bit of mask instead of actually inverting "1", "0" of each signal bit of register 70. The black points in the circumference of the pattern can be detected as explained above by the images 74, 76 and inspection patterns 62, 64, and the pinholes within the pattern can be detected by the images 78, 80 and inspection patterns 62, 64.

As explained above, automatic detection of defects of masks for printed circuit board is effectively carried out in the system of FIG. 11. The inspection pattern has the side guard bit groups ($G_{AI}$ to $G_{An}$), ($G_{BI}$ to $G_{Bn}$) and the outline verification bits $G_{C1}$, $G_{D2}$, and defect detection in a region other than the desired region can be avoided. An inspection mask for diagonal direction is provided in addition to inspection masks for vertical and horizontal directions, and, hence, accurate detection for the entirety of the mask can be carried out.

We claim:

1. A pattern inspection system for inspecting a pattern formed on a base, the pattern having a body and edges, said inspection system obtaining information regarding the light transmission of lack of light transmission through the pattern by scanning the pattern with a light beam, said inspection system comprising:

detection means, including means for separately detecting the body of the pattern and generating body signals representing the body of the pattern and means for separately detecting the pattern edges and the angle of the edges with respect to a predetermined line and generating edge signals representing the edge of the pattern;

first memory means having a plurality of memory units, operatively connected to said pattern body detection means and said edge detection means, for separately storing the body signals and the edge signals in separate memory units of the said first memory means, wherein a first of the plurality of the memory units stores the body signals, wherein the remaining units of the plurality of memory units store the edge signals, wherein each of the remaining units represents the angle of the edge signals stored therein;

width measuring means, operatively connected to said first memory means, for measuring the width of the body of the pattern between two edges of the pattern by summing the body signals between the two edges of the pattern;

a bidimensional register, operatively connected to said detection means, for storing the body signals; and an inspection mask circuit, including an inspection mask and operatively connected to said bidimensional register, said inspection mask having a first mask for detecting the body edge and pinholes in vertical and horizontal directions, and a second mask for detecting the body edge and pinholes in diagonal directions.

2. A pattern inspection system as recited in claim 1, wherein the pattern has an irregular edge, said pattern inspection system further comprising interpolation means, operatively connected between said detection means and said first memory means, for converting the edge signals representing the irregular edge of the pattern, when a portion of the edge of the pattern is irregular along a predetermined length of the edge of the pattern, from a state representing light transmission to a state representing light interruption or from a state representing light interruption to a state representing light transmission in dependence upon whether the irregular edge should be light transmitting or light interrupting.

3. A pattern inspection system as recited in claim 1 or 2 wherein the base is either light transmitting or light interrupting, said pattern inspection system further comprising switching means, operatively connected between said detection means and said first memory means, for converting the body signals and the edge signals from a state representing light transmission to a state representing light interruption or from a state representing light interruption to a state representing light transmission in dependence upon whether the base is light transmitting or light interrupting.

4. A pattern inspection system as recited in claim 1 or 2, further comprising:

reduction means, operatively connected to said detection means, for reducing the edge signals and body signals by generating average body signals and average edge signals, which average body signals represent whether the body signals representing the body within a predetermined area of the pattern are, on the average, light transmitting or light interrupting, and which average edge signals represent whether the edge signals representing the edge of the pattern along a predetermined length of an edge of the pattern are, on the average, light transmitting or light interrupting; and second memory means, operatively connected to said reduction means, for storing the average body signals and average edge signals.

5. A pattern inspection system as recited in claim 1 or 2, wherein the pattern contains a stain and a pinhole and wherein the body signals include a first defect component and a second defect component, said pattern inspection system further comprising stain and pinhole correction means, operatively connected between said detection means and said first memory means, including means for detecting the presence of the first defect component representing a light interrupting stain, including means for detecting the presence of the second defect component representing a light transmitting pinhole, and including means for converting the first defect component into a first corrected signal representing light transmission and for converting the second defect signal into a second corrected signal representing light interruption, the first and second corrected signals representing corrected body signals, prior to transmitting the body signals to the said first memory means.

6. A pattern inspection system as recited in claim 2, wherein said edge interpolation means comprises:
a first multiple line shift register having N lines, where N is an integer greater than or equal to 4, each line having an interpolation register input and an interpolation register output, and having a plurality of cells in each line, each cell having a cell output, the first interpolation register input operatively connected to said detection means, and the Nth interpolation register output operatively connected to said first memory means;
a NOT gate having an input operatively connected to the second interpolation register output, and having an output;
a NAND gate having a first input operatively connected to the output of said NOT gate, having a second input, and having an output;
a second multiple line shift register having N−1 lines, each line having a temporary register input and a temporary register output, and having a plurality of cells in each line, the first temporary register input operatively connected to the first interpolation register output, the first temporary register output operatively connected to the second interpolation register input, the output of said NAND gate operatively connected to the second temporary register input, the second temporary register output operatively connected to the third interpolation register input, the N−1th temporary register output operatively connected to the Nth interpoltion register input, the N−1th temporary register input operatively connected to the N−1th interpolation register output;
a first OR gate having a first input operatively connected to the first interpolation register output, having a second input operatively connected to the second interpolation register output, having a third input operatively connected to the third interpolation register output, and having an output;
an AND gate having a first input operatively connected to a predetermined cell output in the second line of said first multiple line shift register, having a second input operatively connected to the output of the first OR gate, and having an output;
a single line shift register having an input operatively connected to the output of said AND gate, and having a plurality of cells and single line cell outputs for each cell; and
a second OR gate having a plurality of inputs operatively connected to the respective single line cell outputs of the said single line shift register, and having an output operatively connected to the second input of said NAND gate.

7. A pattern inspection system as recited in claim 3, wherein said switching means is operatively connected to receive first and second switching signals, wherein said switching means comprises:
a NOT gate having a NOT input operatively connected to said detection means, and having an output;
a first AND gate having a first input operatively connected to the output of said NOT gate, having a second input operatively connected to receive the first switching signal, and having an output;
a second AND gate having a first input operatively connected to said detection means, having a second input operatively connected to receive the second switching signal, and having an output; and
an OR gate having a first input operatively connected to the output of the first AND gate, having a second input operatively connected to the output of the second AND gate, and having an output operatively connected to said first memory means.

8. A pattern inspection system as recited in claim 4, wherein said reduction means is operatively connected to receive a reference signal, wherein said reduction means comprieses:
fourth memory means, operatively connected to said detection means, having a plurality of lines for storing the body signals and the edge signals;
a first summing circuit having first summing inputs respectively connected to said plurality of lines of said fourth memory means, and having first summing outputs, said first summing outputs representing the sum of said first summing inputs;
a shift register circuit having a plurality of lines, having a plurality of cells within each line, having shift register inputs operatively connected to the respective first summing outputs of said first summing circuit, and having a plurality of shift register outputs;
a second summing circuit, having second summing inputs operatively connected to the respective outputs of said shift register circuit, and having second summing outputs, for generating a summing signal representing the sum of the second summing inputs; and
a comparator circuit, having a first input operatively connected to the second summing outputs of said second summing circuit, having a second input operatively connected to receive the reference signal, and having an output operatively connected to said second memory means, for comparing the summing signal from the said second summing circuit to the reference signal, and for generating an output signal representing that the number of cells of said fourth memory compared and found to be containing a pattern signal is greater than the value of the reference signal.

9. A pattern inspection system as recited in claim 5, wherein said stain and pinhole correction means comprises:
- a first shift register circuit having three lines and having three cells within each line each cell having a cell input and a cell output, the cell input of the first cell of said first shift register circuit means;
- a first AND gate having a first input operatively connected to the cell ouput of the first cell in the first line of said first shift register circuit, having a second input operatively connected to the cell output of the second cell in the first line of said first shift register circuit, having a third input operatively connected to the cell output of the third cell in the first line of said first shift register circuit, having a fourth input operatively connected to the cell output of the third cell in the second line of said first shift register circuit, having a fifth input operatively connected to cell output of the third cell in the third line of said first shift register circuit, having a sixth input operatively connected to the cell output of second cell in the third line of said first shift register circuit, having a seventh input operatively connected to the cell output of first cell in the third line of said first shift register circuit, having an eighth input operatively connected to the cell output of first cell in the second line of said first shift register circuit, and having an output;
- a first OR circuit having a first input operatively connected to the cell output of the first cell in the first line of said first shift register circuit, having a second input operatively connected to the cell output of the second cell in the first line of said first shift register circuit, having a third input operatively connected to the cell output of the third cell in the first line of said first shift register circuit, having a fourth input operatively connected to the cell output of the third cell in the second line of said first shift register circuit, having a fifth input operatively connected to the cell output of the third cell in the third line of said first shift register circuit, having a sixth input operatively connected to the cell output of the second cell in the third line of said first shift register circuit, having a seventh input operatively connected to the cell output of the first cell in the third line of said first shift register circuit, having an eighth input operatively connected to the cell output of the first cell in the second line of said first shift register circuit, and having an output;
- a second OR gate having a first input operatively connected to the cell output of the second cell of the second line of said first shift register circuit, having a second input operatively connected to the output of said first AND circuit, and having an output;
- a second AND gate having a first input operatively connected to the output of said second OR gate, having a second input operatively connected to the output of the said first OR gate, and having a second AND output;
- a flip-flop circuit having a flip-flop input operatively connected to the output of said second AND gate, and having a flip-flop output; and
- a second shift register circuit having three lines and a plurality of cells within each line, each line having a line input and a line output, the first line input operatively connected to the cell output of third cell in first line of said first shift register circuit, the second line input operatively connected to the flip-flop output, the third line input operatively connected to the cell output of the third cell in the third line of the said first shift register circuit, the first line output operatively connected to the cell input of the first cell in the second line of said first shift register circuit, the second line output operatively connected to the cell input of the first cell of the third line of said first shift register circuit, and the third line output operatively connected to said first memory means.

10. A pattern inspection system for inspecting a pattern formed on a base and having a body and edges, comprising:
- means for providing a light beam;
- means for scanning the pattern with the light beam and for generating a pattern signal representing the pattern, said pattern signal including a body signal component representing the body of the pattern and an edge signal component representing the edge of the pattern;
- first detection means, operatively connected to said scanning means, for detecting the body signal component and for generating body signals representing the body signal component of the pattern signal;
- second detection means, operatively connected to said scanning means, for detecting the edge signal component, and for generating edge signals representing the edge signal component of the pattern signal, the edge signals comprising angled edge signals, each of the angled edge signals representing the edge signal component and the angle of the edge of the pattern with respect to a predetermined line;
- first memory means, operatively connected to both said first and second detection means, having a pluraliy of memory units including a first memory unit for storing the body signals, the remaining memory units for separately storing the angled edge signals in the respective memory unit representing the angle of the respectie edge of the pattern with respect to the predetermined line;
- width measuring means having a predetermined width range, operatively connected to said first memory means, for measuring the width of the body of the pattern between two edges of the pattern, by summing the body signals stored in said first memory means in dependence upon the detection of the angled edge signals stored in said first memory means, detecting the angled edge signals represents that there are edges of the pattern between which a width can be measured, and for comparing the sum of the body signals with the predetermined width range and for generating an error signal whenever the width of the pattern is outside the predetermined width range;
- third memory means, operatively connected to said width measuring means, for storing the error signals generated by said width measuring means;
- a bidimensional register, operatively connected to said detection means, for storing the body signals; and
- an inspection mask circuit, including an inspection mask and operatively connected to said bidimensional register, said inspection mask having a first mask for detecting the body edge and pinholes in vertical and horizontal directions, and a second mask for detecting the body edge and pinholes in diagonal directions.

11. A pattern inspection system as recited in claim 10, wherein said first detection means is operatively connected to receive a predetermined light detection signal, wherein said first detection means comprises:

means for detecting the light beam passing through the pattern and generating a light body signal; and a comparison circuit, operatively connected to said light detecting means, for outputting a body signal whenever the light body signal is greater than the predetermined light detection comparison signal.

12. A pattern inspection system as recited in claim 10, wherein the light beam is diffracted as it passes through the edges of the pattern resulting in a diffracted light beam, wherein said second detection means is operatively connected to receive a predetermined diffracted light detection comparison signal, wherein said second detection means comprises:

light detecting means, including first through eighth detectors, for detecting the diffracted light beam passing through the edge of the pattern, wherein the first light detector abuts the second light detector, wherein the second light detector abuts the third light detector, wherein the third light detector abuts the fourth light detector, wherein the fourth light detector abuts the fifth light detector, wherein the fifth light detector abuts the sixth light detector, wherein the sixth light detector abuts the seventh light detector, wherein the seventh light detector abuts the eighth light detector, wherein the eighth light detector abuts the first light detector, wherein the first light detector is operatively connected to the fifth light detector, wherein the second light detector is operatively connected to the sixth light detector, wherein the third light detector is operatively connected to the seventh light detector, wherein the fourth light detector is operatively connected to the eighth light detector, resulting in first through fourth light detector pairs, each light detector pair producing a diffracted light detection signal whenever one of the light detectors in the pair detects the diffracted light beam; and first through fourth comparator circuits operatively connected to said first through fourth light detectors pairs, respectively, said first through fourth comparator circuits generating an angled edge signal whenever the diffracted light detection signal is equal to the predetermined diffracted light detection comparison signal.

13. A pattern inspection system as recited in claim 1 or 10, wherein said width detection means is operatively connected to receive a first and second comparison value, wherein said width measuring means comprises:

a first shift register circuit operatively connected to the angled edge signal memory units of said first memory means and having a plurality of first shift register outputs;

an OR circuit having a plurality of inputs each of which is connected to one of the first shift register outputs of said first shift register circuit, and having an output;

an AND gate having a first input operatively connected to the output of said OR circuit, having a second input, and having an output operatively connected to said third memory means;

a second shift register circuit operatively connected to the first memory unit of said first memory means, and having a plurality of second shift register outputs;

a bit summing circuit, having a plurality of inputs operatively connected to the second shift register outputs, and having outputs, for generating a summing signal representing the sum of the inputs; and a window comparison circuit, having a first input operatively connected to the outputs of said bit summing circuit, having second and third inputs operatively connected to receive first and second comparison values, respectively, and having an output operatively connected to the second of said AND gate, for comparing the value of the summing signal with the first and second comparison values, and for generating an out of range signal whenever the value of the summing signal is not within the range determined by the first and second comparison values.

14. A pattern inspection system, comprising:

a bidimensional register which stores image pattern data;

an inspection mask formed on said bidimensional register; and an inspection circuit which extracts the signal for inspection from said register, said inspection mask being adapted to check the stored image pattern data in said register, wherein said inspection mask provides a first inspection mask which detects pattern edge points in vertical and horizontal directions for said stored image pattern data and pinholes after the inversion between light transmission and light interruption, respectively, and a second inspection mask which detects pattern edge points in a diagonal direction for said stored image pattern data and pinholes after inversion.

15. A pattern inspection system as recited in claim 14, wherein the inspection mask provides bits for detecting the outline of said stored image pattern data, right and left guard bits for preventing checking failures, bits for confirming the correctness of the outline detected by said outline detecting bits, and bits for detecting light-interrupting points.

16. A pattern inspection system as recited in claim 14, wherein said inspection mask includes a light interrupting point detection pattern consisting of a plurality of linear bits and a plurality of guard bits which are located on both sides of said light interrupting point detection pattern for preventing a misdetection from occurrence in the vicinity of the edge of said stored image pattern.

17. A pattern inspection system as recited in claim 14, wherein the direction of scanning said inspection mask is selected from among eight directions with an interval of 45° therebetween.

* * * * *

UNITED STATES PATENT AND TRADEMARK OFFICE
CERTIFICATE OF CORRECTION

PATENT NO. : 4,547,895
DATED : October 15, 1985
INVENTOR(S) : KIKUO MITA ET AL.

It is certified that error appears in the above-identified patent and that said Letters Patent is hereby corrected as shown below:

Col. 14, line 47, after "register" insert --line--;

line 66, after "memory" insert --means--.

Col. 18, line 39, after "transmission" insert --(transparent)--;

line 40, after "interruption" insert --(opaque)--.

Signed and Sealed this

Eighteenth Day of February 1986

[SEAL]

Attest:

DONALD J. QUIGG

Attesting Officer

Commissioner of Patents and Trademarks